Nov. 28, 1933.  A. STOLL  1,937,254
PEDESTAL FOR ARTICLES OF FURNITURE, SUCH AS
MOUNTED CHAIRS, TABLES, AND THE LIKE
Filed Feb. 18, 1932
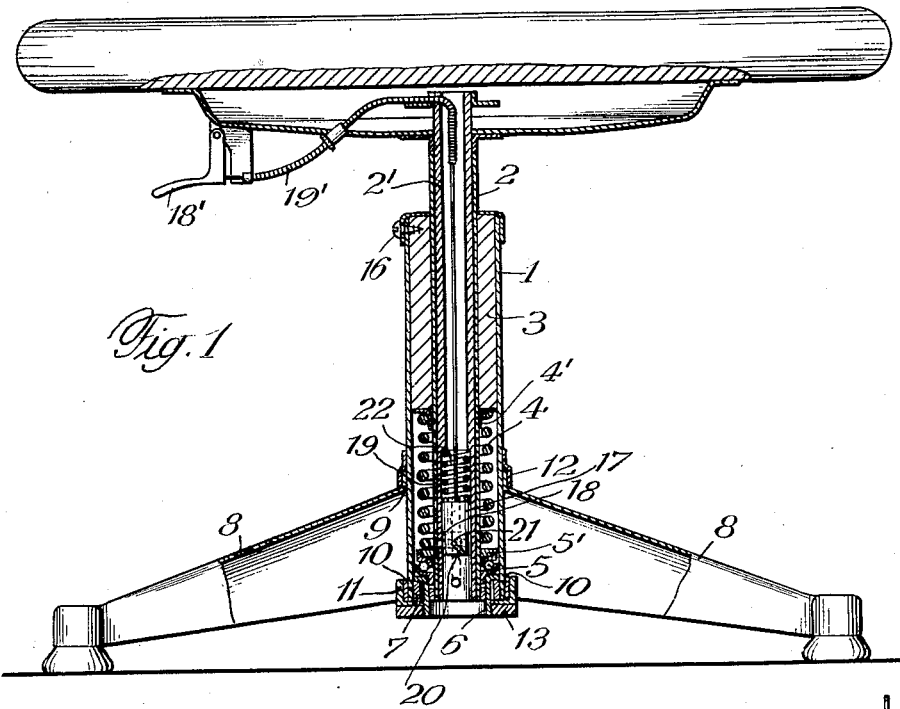
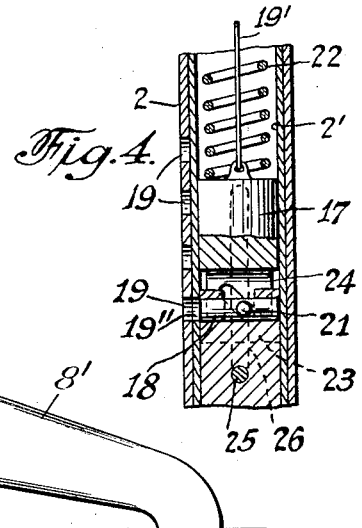
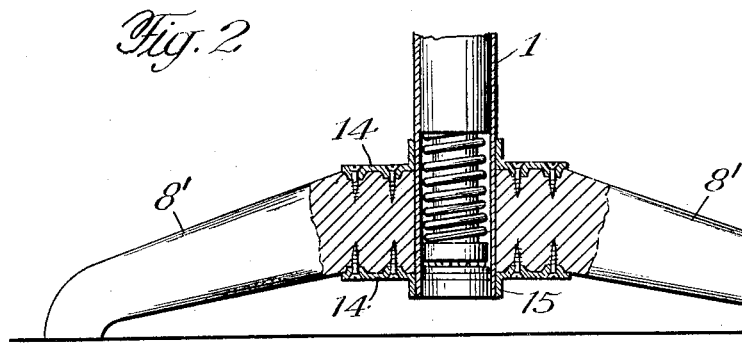
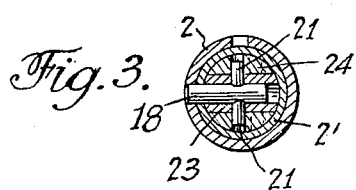
Inventor:
Albert Stoll,
By Sommers & Young
Attys.

Patented Nov. 28, 1933

1,937,254

UNITED STATES PATENT OFFICE 1,937,254

PEDESTAL FOR ARTICLES OF FURNITURE, SUCH AS MOUNTED CHAIRS, TABLES, AND THE LIKE

Albert Stoll, Koblenz, Switzerland

Application February 18, 1932, Serial No. 593,844, and in Germany February 26, 1931

2 Claims. (Cl. 155—94)

This invention relates to pedestals for articles of furniture, such as mounted chairs, tables and the like; it is the object of the invention to provide a pedestal which permits an adjustment in height, as well as a turning of the seat or table and a resilient support of the latter. The pedestal according to the invention comprises an outer vertical tubular member to which a foot member is connected and in which a supporting shaft for the furniture portion is supported, the bearing means for turnably and axially displaceably holding said shaft and spring mounting means for said shaft are housed so as to be hidden from view and protected against dust collecting thereon.

In the drawing two constructional forms of the invention are illustrated by way of example only, in which Fig. 1 is a sectional elevation of a pedestal for a mounted chair, and Fig. 2 is a view similar to Fig. 1 of a modification.

Figs. 3 and 4 show details on a larger scale.

In the constructional form of the pedestal illustrated in Fig. 1 the upstanding tubular member is designated by 1. In the tube or sleeve of metal 1, a supporting shaft for the upper furniture portions consisting of two telescoped tubes 2, 2', is enclosed. The seat of the chair is rigidly fixed to the tube 2' and the height of the seat is adjustable by adjustment of the relative positions of the tubes 2 and 2' in the axial direction. Further in the tubular member 1 there is arranged a guide bushing 3 acting as a neck bearing in which the tube 2 is adapted to turn and to move in the axial direction a coil spring 4, a thrust ball bearing 5 and a lower bushing 6 which is supported by a ring 7 secured to the inner surface of the metal tube 1. The spring 4 is inserted between a spring seat 4' fastened on the tube 2 and an annular plate 5' resting against the upper race ring of the ball bearing and provides a resilient mounting of the seat. All the parts housed in the guide member except of the ring 7 are inserted in said member from above so as to be readily removable or exchangeable respectively.

The metals legs 8 of U-shaped cross-section constituting the foot member are provided on the upper side and on the lower side with an upwardly directed flange 9 and 10 respectively, the flanges 10 being exteriorly gripped by an upturned flange of a removable cap 11 and the flanges 9 by a socket 12 secured to the metal tube 1. The flanges 9 and 10 are firmly held in the cap 11 and the socket 12 respectively by a nut 13 screwed on a threaded portion of the bushing 6, whereby the legs 8 are rigidly connected to the tube 1.

In order to adjust the height of the seat above the floor an adjusting device is inserted in the inner tube 2' comprising a pivotal operating handle 18' and a flexible cable 19' connecting said handle with a plunger 17, displaceably arranged in an enlarged portion of the bore of the inner tube 2'. The latter is provided with a hole 19'' (Fig. 4) adapted to be brought to register with any one of a series of holes 19 arranged in a vertical row in the outer tube 2, a transverse bolt 18 passes through the registering holes and locks the two tubes 2 and 2' in their adjusted position.

The transverse bolt 18 is slidably mounted in a plug 23 inserted in the lower end of the tube 2' rigidly fixed to the latter. The upper end of the plug has two lateral recesses into which lateral projections 24 of the plug 17 (Fig. 3) enter. In each of the lateral projections 24 an oblique groove 20 is provided and pins 21 laterally projecting from the bolt 18 and connected to the latter cooperate with said grooves 20. The plunger 17 is acted upon by a spring 22 inserted between it and a shoulder formed at the inner end of the enlarged bore of the inner tube 2'. The pressure of the spring 22 causes the groove 20 to act on the pins 21 and forces the bolt 18 in the outward direction into the registering holes of the tubes 2 and 2' so as to lock the seat in the respective position of adjustment. When it is desired to readjust the height of the seat, the handle 18' is raised, so that through the intermediary of the flexible cable 19' the plunger 17 is lifted against the action of the spring 22, whereby due to the pressure of the oblique grooves 20 on the pins 21 the bolt is retracted and pulled out of the respective hole in the outer tube 2 as shown in Fig. 4, thus permitting the inner tube 2' to be axially shifted relatively to the outer tube 2, until the outer end of the bolt stands opposite the hole 19 corresponding to the desired height of the seat of the chair above the floor. Upon releasing the handle 18' the plunger automatically locks the two tubes 2, 2' by pushing the bolt 18 outwardly. To insure the engagement of the locking bolt 18 with one of the openings 19, the telescoping tubes 2 and 2' are prevented from rotational displacement relatively to each other by a pin 25 fixed in the tube 2' and engaging a vertical groove 26 arranged in the tube 2 (Fig. 4).

The constructional form of the invention shown in Fig. 2 is distinct from the one illustrated in Fig. 1 by the application of wooden legs 8' instead of the metal legs 8. For securing the legs 8' to the tube 1, to the outer surface of the latter short sleeves 15 provided with off-standing ears 14 are secured between which the legs 8' are inserted and held fast by wood screws, as shown. Preferaby the sleeves 15 are connected to the metal tube 1 by welding, but when it is desired to arrange the legs in removable manner on the tube, for example for purposes of transport, the lower sleeve may be secured to the tube by means of cotter pins or the like.

The invention provides considerable improvements in the construction of a pedestal for articles of furniture, such as chairs, tables and the like in as much as a pedestal is obtained which permits an adjustment in height, a turning of the seat or table and a resilient support for the weight to be carried by the pedestal. All the elements, which are necessary for these functions of the pedestal are hidden for the greatest part in an outer tube, whereby a more pleasing aspect of the chair and the like and a better protection of the parts against dust and wear is obtained.

Furthermore, the construction according to the invention is advantageous in the respect that upon the removal of a screw 16 securing a cap on top of the member in position, the supporting shaft as well as all the relevant parts inside said member can be demounted, thus enabling exchanging any part when it is worn.

I claim:

1. In a pedestal for articles of furniture, such as mounted chairs tables and the like, in combination, an upstanding tubular member, a foot member fixed to said tubular member, a supporting shaft for the upper furniture portions, said supporting shaft consisting of two parts axially displaceable relatively to each other for height adjustment, means to lock said two parts in their adjusted position, bearing means mounted in said tubular member for turnably holding said supporting shaft, and spring means interposed between said tubular member and said supporting shaft for resiliently mounting the latter, said supporting shaft, locking means, bearing means and spring means being arranged within said tubular member.

2. In a pedestal for articles of furniture, such as mounted chairs, tables and the like, in combination, an upstanding tubular member, a foot member fixed to said tubular member, a supporting shaft for the upper furniture, said supporting shaft consisting of two telescoping tubes axially displaceable relatively to each other for height adjustment, means to lock said two tubes in their adjusted positions, a neck bearing mounted in the upper part of said tubular member for turnably holding said shaft and a ball thrust bearing arranged in the lower part of said tubular member for supporting said shaft, and spring means interposed between the outer of the shaft tubes and said thrust bearing for resiliently mounting said shaft, said supporting shaft, locking means, bearing means and spring means being arranged within said tubular member.

ALBERT STOLL.